United States Patent [19]
Garth

[11] 3,745,472

[45] July 10, 1973

[54] SYNCHRONOUS DIGITAL SYSTEM HAVING A CLOCK DISTRIBUTION SYSTEM

[75] Inventor: Emory C. Garth, Austin, Tex.

[73] Assignee: Texas Instruments Incorporated, Dallas, Tex.

[22] Filed: July 1, 1971

[21] Appl. No.: 158,718

[52] U.S. Cl. .................................. 328/63, 307/269
[51] Int. Cl. .............................................. H03k 1/00
[58] Field of Search ................307/269; 328/63, 72

[56] References Cited

UNITED STATES PATENTS

| | | | |
|---|---|---|---|
| 3,479,603 | 11/1969 | Overstreet, Jr. | 328/63 X |
| 3,295,138 | 6/1966 | Nelson | 333/31 R |
| 3,202,769 | 8/1965 | Coleman, Jr. | 328/72 X |
| 3,270,288 | 8/1966 | Hackett | 328/63 |
| 3,633,113 | 1/1972 | Grubel | 307/269 X |
| 3,644,756 | 2/1972 | Furois | 307/269 |

OTHER PUBLICATIONS

Layden, "Vernier Timing...," IBM Tech. Disc. Bul., Vol. 9, No. 10 at 1344–1345 [Mar. 1967 ]

*Primary Examiner*—John W. Huckert
*Assistant Examiner*—Ro E. Hart
*Attorney*—Harold Levine, James T. Comfort et al.

[57] ABSTRACT

A clock distribution system within a synchronous digital system, such as a digital data processing system, permits adjustment of clock pulse width and time occurrence at each individual logic card within the system. An oscillator generates a clock signal having a pulse width larger than the desired clock pulse width. This generated clock signal is distributed through a plurality of fanout circuits to a plurality of logic cards located throughout the system. On each logic card a first adjustable delay line permits time delay adjustment to realign waveform transitions and thus synchronize the system. This time-aligned signal is then connected to one input of an AND gate and also is inverted and connected through a second adjustable delay line to the other input of the AND gate, thus permitting selective control of the clock pulse width.

2 Claims, 4 Drawing Figures

INVENTOR
Emory C. Garth
BY
ATTORNEY

SYNCHRONOUS DIGITAL SYSTEM HAVING A CLOCK DISTRIBUTION SYSTEM

This invention relates to high-speed synchronous digital systems, and more particularly to means and method for the generation and distribution of time synchronizing (system clock) signals throughout such a system.

In a synchronous digital system, such as a digital data processing system, a plurality of operations may be carried out at the same time under direct control of system clock pulses. For synchronous operation, the clock signal waveform transition which initiates circuit operation must occur at substantially the same point in time as the input to a substantial plurality of logic circuits located throughout the system.

In recent years the switching speed of logic circuits has been drastically reduced. At present, a state of the art logic circuit may have a typical switching speed of 2 nanoseconds, dependent to some extent upon circuit loading. Switching speeds have decreased to such an extent that it has now become necessary to consider transmission line signal propagation times in the design of high-speed digital data processing systems in order to maintain synchronized operation. For example, an electrical signal propagation time on copper strip line etched on epoxy glass circuit boards is typically about 6 inches per nanosecond. Thus, each foot of transmission line introduces a signal propagation delay equivalent to an additional logic circuit. Due to differences in propagation time delays introduced by differences in transmission line lengths and individual circuit switching speeds on signal paths, highly synchronized operation has heretofore been difficult to obtain.

Operational speed is of the essence in digital data processing systems. High speed operation necessitates short clock periods. Also, it is desirable to maintain the width of the energizing pulse, i.e., the duty cycle, relatively narrow as compared to the total clock period in order to avoid triggering a plurality of series connected logic circuits with the same clock pulse (commonly referred to as "racing"), wherein said logic circuits are designed for operation at subsequent clock pulses. These highspeed short duty cycle clock pulses are subject to attenuation and distortion during transmission, thus endangering the reliability of system operation and synchronization.

In view of the foregoing, it is apparent that both pulse width and synchronized occurrence of clock pulses are critical parameters in high speed, highly reliable digital data processing systems.

In the digital processing system of this invention, an oscillator generates a clock signal having a pulse width larger than the desired clock pulse width. The initial clock signal is distributed through a plurality of multiple output, noninverting logic circuits to obtain the desired number of clock signals, typically one clock signal for each logic card. At each logic card the clock signal is transmitted through a first adjustable delay line to align the leading edges of all clock pulses in the system. The aligned clock pulses are each fed to a logic circuit having an inverting output and a noninverting output. The inverted output is connected through a second adjustable delay line to one input of an AND gate, the other input of which is connected to the noninverting output, thus providing for selective adjustment of clock pulse width. In this manner, selectively shaped synchronous clock pulses are obtained at each logic card throughout the system to provide reliable synchronous operation.

Accordingly, it is an object of this invention to provide an improved means and method to obtain synchronized operation in a synchronous digital system.

It is a further object of this invention to provide a reliable, highly synchronized high speed digital data processing system.

It is another object of the invention to provide an improved clock distribution system for high speed synchronized digital systems.

It is another object of the invention to provide a clock distribution system for a synchronized digital system wherein a clock pulse is time-aligned and slectively shaped at selective locations throughout the system.

It is a further object of the invention to provide a clock distribution system for a synchronized digital data processing system wherein a clock pulse is time-aligned and selectively shaped on each logic card throughout the system.

Additional objects and advantages will become apparent from the following detailed description in conjunction with the accompanying drawings, in which.

Figure 1:
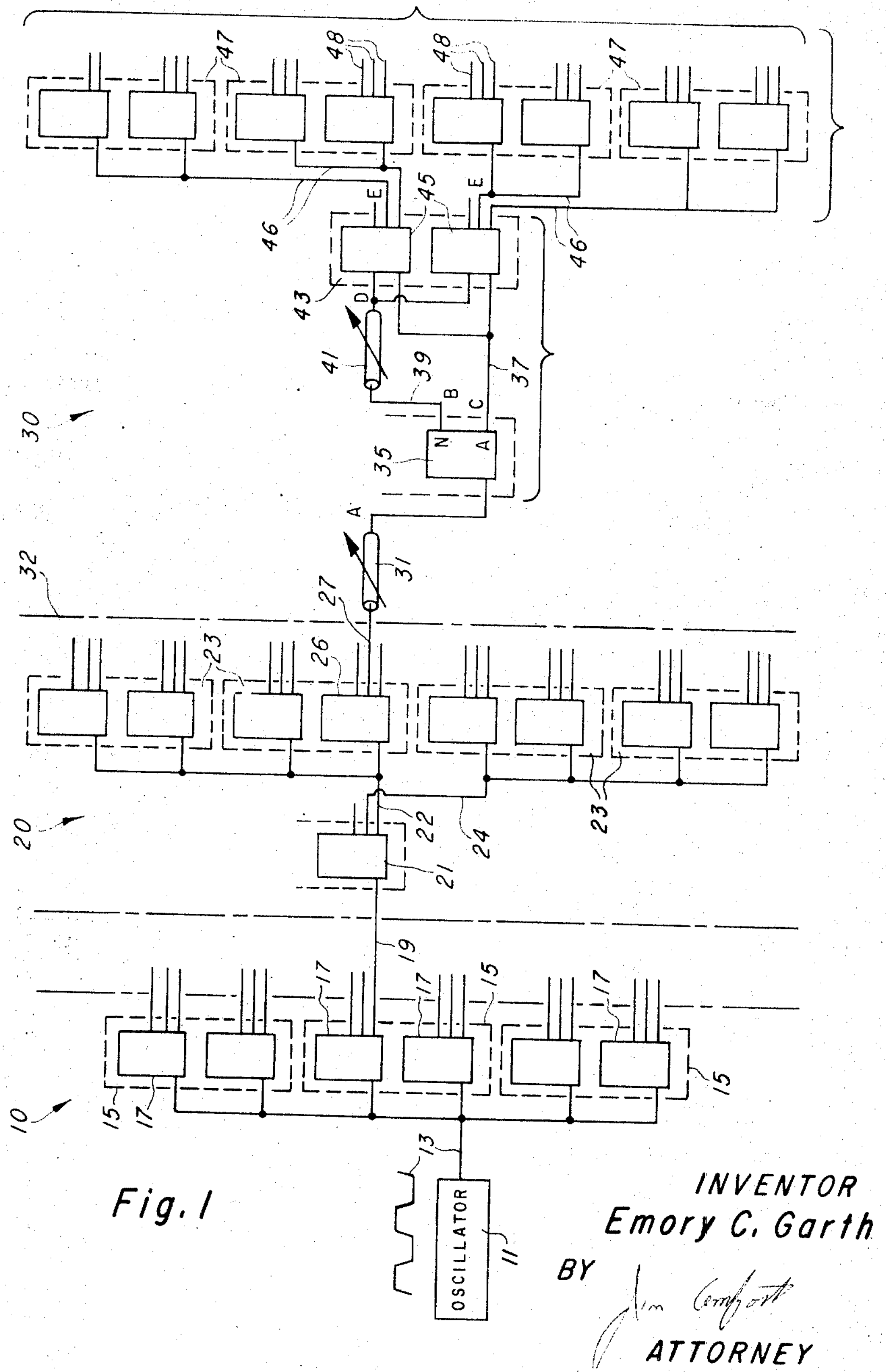
FIG. 1 is a schematic illustration of a preferred clock distribution system.

Referring now to the drawings, a clock distribution system in accordance with the present invention is illustrated in FIG. 1. On a clock generator board 10, which may be located anywhere in the system, an oscillator 11 generates an initial clock signal 13 having a duty cycle significantly larger than that required at each logic card. The generated clock signal 13 is connected to a plurality of multiple output noninverting logic circuits 17 which are connected in fanout configuration and are also located on the clock generator board. Each of the multiple output noninverting logic circuits 17 are illustrated in the preferred embodiment of dual curcuit packages 15. The noninverting logic circuits 17 provide fanout capability for increasing the number of clock signals. All outputs of logic circuits 17 are individually connected to a fanout circuit board. A typical logic clock signal, which is identical to the outputs of the other logic circuits 17, is connected via transmission line 19 to a multiple output noninverting logic circuit 21 on a fanout circuit board 20. The circuit 21 may be identical to the circuits 17. In a similar manner, each of the outputs of the circuits 17 will be connected to a fanout board in order to increase the number of clock signals to the desired number, typically one clock signal per logic card in the system. Logic output 22 of circuit 21 is connected to both inputs of multiple output noninverting dual package circuits 23. Logic output 24 is similarly connected. An output of logic circuit 26 is connected to a logic card 30 via transmission line 27 as a representative logic clock signal (typically each output of circuits 23 is connected to an individual logic card). The outputs of circuits 23 are identical to generated clock signal 13 except for a net time delay introduced by circuit switching times and transmission line signal propagation delays, as well as some distortion incurred during transmission. Respective transmission lines 19 and 27 should be substantially equal in length throughout the system in order to minimize differences in propagation delays.

Each logic card in the system includes a logic card clock distribution system 30 in addition to a substantial plurality of logic circuits which will be connected to the outputs of logic circuits 47. Transmission line segments 19 and 27 are maintained substantially respectively equal through out the system in order to maintain a substantial degree of synchronism at interface 32 with each logic card throughout the system. Adjustable delay line 31 on each logic card enables each of the pulses 27 to be time-aligned to a high degree, thus obtaining a high degree of synchronism in the system. The output of adjustable delay line 31 is connected as an input to logic circuit 35 having a noninverted output A and an inverted output N. Logic circuit 43 comprises two identical multiple output AND gates 45. Noninverted signal 37 is connected as one input to each of the AND gates 45 and inverted output 39 is connected to an adjustable delay line 41 which enables a selected time delay to be introduced to the signal 39. The output of delay line 41 is connected to the other input of both AND gates 45. The multiple outputs of the AND gates 45 are connected as inputs to a plurality of identical dual package multiple output noninverting gates 47 to provide additional fanout capability on each logic card. The outputs of the noninverting gates 47 are connected to logic circuits (not shown) which are also located on the logic card. These latter logic circuits perform the various data processing functions in the system, synchronized by the clock signals 48.

The adjustable delay line 31 enables the insertion of a predetermined time delay on each clock signal 27 in order to realign the leading edges of each of the clock pulses 27 in the system, thus synchronizing the clock pulses within the system. An oscilloscope, for example, may be employed to detect the most delayed clock signal and align all clock signals therewith.

Figure 3:
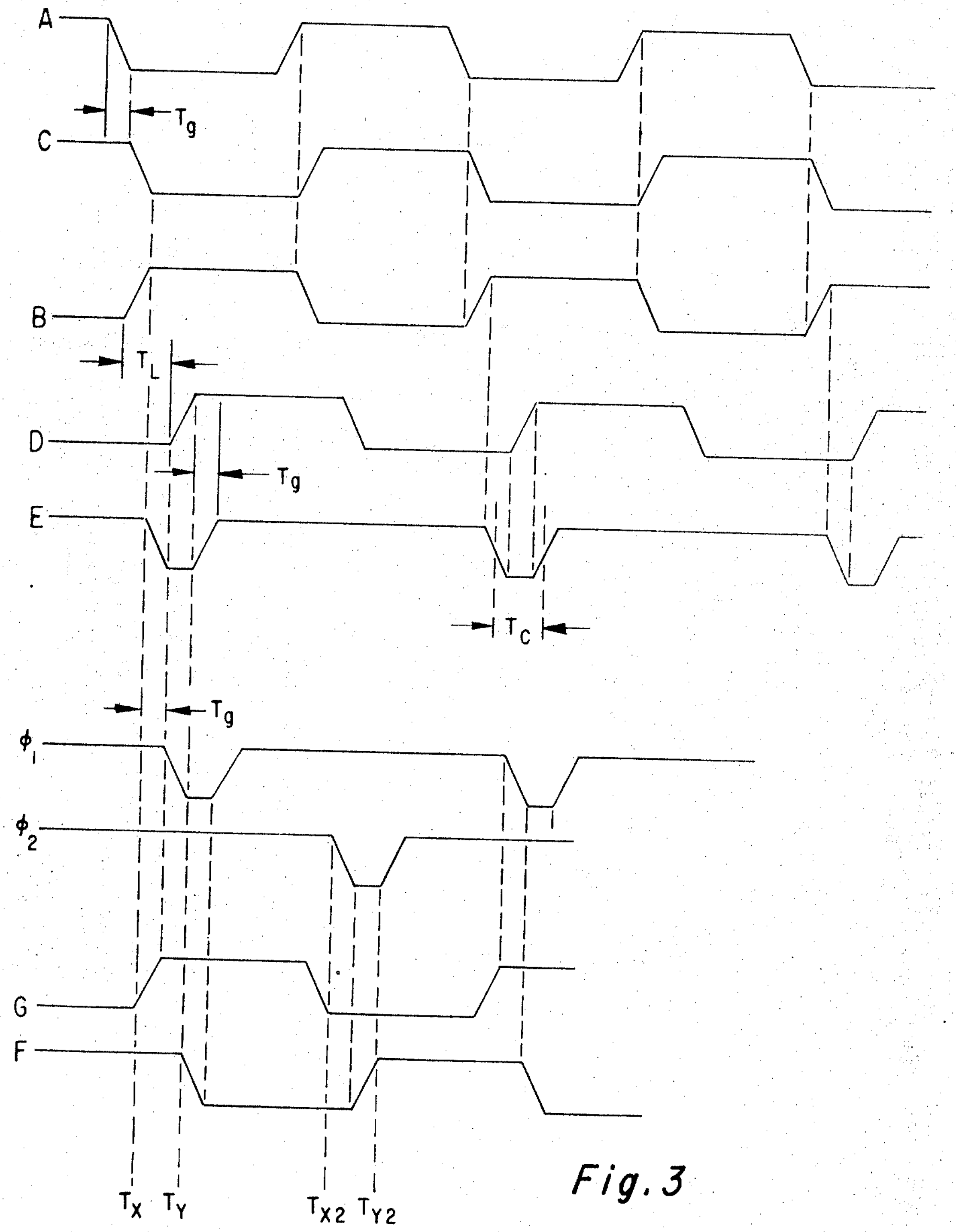
FIG. 3 is a timing diagram illustrating the operation of the logic card clock distribution system.

Insertion of a predetermined desired time delay at delay line 41 in conjunction with AND gate operation enables a plurality of synchronized selectively shaped clock pulses 46 to be obtained, each of the clock pulses 46 being in synchronism and having a desired duty cycle. This aspect of the operation of the logic card clock distribution system 30 is illustrated in FIG. 3 with respect to a timing diagram. Clock signal A is the output of delay line 31, and will be of the same shape (neglecting distortion) as output 13 of the clock oscillator 11. Clock signal A is shown as having a 50 percent duty cycle as being the preferred clock signal. Although the 50 percent duty cycle is not required, this signal can be most easily generated. Time period $T_g$ designates the length of time required for the clock signal to change states, which results from the time required for a logic circuit to switch, typically about 2 nanoseconds. Signal C is the non-inverted output 37 of gate 35, shown shifted in time by period $T_g$ with respect to signal A as a result of the operation of gate 35. Signal B is the inverted output 39 of gate 35, also shown as shifted in time by the period required for the gate to switch. Signal D is the output of adjustable delay line 41 which has been delayed by a selective desired time period $T_L$. Signals C and D are connected as inputs to the AND gates 45. Considering that AND gates 45 are negative logic, the top portion of each of the pulses in FIG. 3 represents a logic "0," and the bottom portion represents a logic "1." At time point $T_x$, signals C and D are both in the logic "1" state, the condition required for an output of an AND gate. At this point the AND gates 45 begin to switch, requiring period $T_g$. At time point $T_y$, signal D has switched to a logic "0" and therefore the condition required for an output of the AND gates is not met. The AND gates switch off, requiring a time period $T_g$. In this manner, a clock signal E is generated having a desired average duty cycle $T_c$ which represents a small portion of the total clock period. In this manner, a clock pulse is selectively time synchronized and shaped at each logic card throughout the system.

Figure 2:
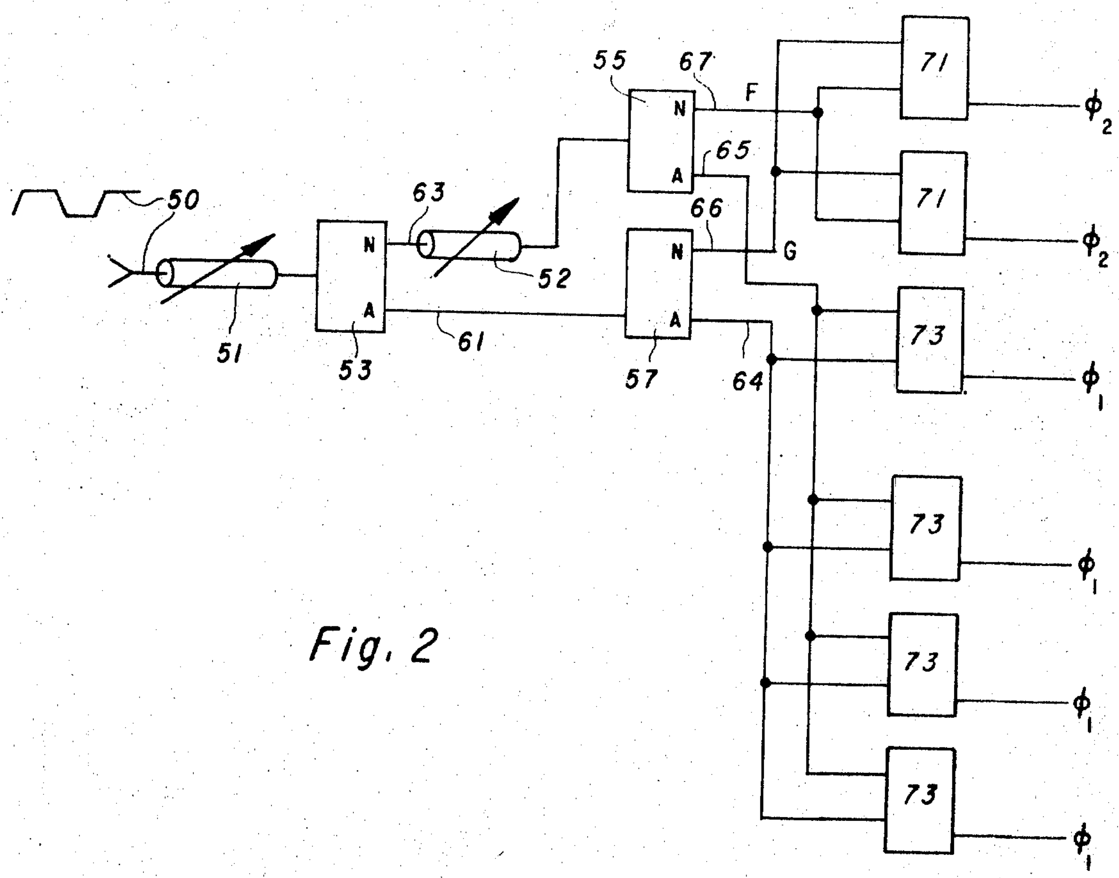
FIG. 2 is a schematic illustration of an alternate embodiment of a logic card clock distribution system.

An alternate embodiment of a logic card clock distribution system in accordance with the invention is illustrated in FIG. 2. Clock pulse 50 enters the logic card and passes through an adjustable delay line 51. The adjustable delay line 51 on each logic card enables the clock pulses at each card to be synchronized. The output of delay line 51 is connected to a logic gate 53 having an inverting output N and a noninverting output A. Noninverted output 61 of gate 53 is connected as an input to gate 57 which may be identical to gate 53. Inverted output 63 of gate 53 is connected through adjustable delay line 52 to the input of gate 55 which may also be identical to gate 53. Noninverted output 64 of gate 57 is connected as an input to a plurality of AND gates 73, the other input of which is connected to noninverted ouput 65 of gate 55. Inverted output 66 of gate 57 is connected as an input to a plurality of AND gates 71, the other input of which is connected to inverted output 67 of gate 55. In this manner, a two phase clock signal is obtained having phases $\phi 1$ and $\phi 2$ which are outputs of the AND gates 73 and 71 respectively. A multiple phase clock signal is frequently utilized to incorporate design flexibility into digital systems. The present invention may be utilized in such systems to selectively synchronize and shape the clock pulses of the various phases.

Operation of the circuit of FIG. 2 will be explained in connection with the timing diagram of FIG. 3. Clock signals $\phi 1$ and $\phi 2$ are the outputs of AND gates 73 and 71 respectively. Clock signal $\phi 1$ is the result of AND gate operation on the noninverted outputs of gates 55 and 57. These signals 65 and 64 are identical to signals C and D except for an additional time shift $T_g$. Therefore, clock signal $\phi 1$ is identical to clock signal E except for a shift in time by period $T_g$. Clock signal $\phi 2$ is a result of AND gate operation on signals 67 and 66 which are designated F and G respectively. Signal G, which is the inverted output of gate 57, corresponds to signal B shifted in phase by one time period $T_g$. Signal F, which is the inverted output of gate 55, corresponds to an inverted signal D shifted in phase by period $T_g$. Clock signal $\phi 2$ results from ANDed combination of signals G and F. At time point $T_{x2}$, both signals G and F are in logic state " 1," the condition required for a logic "1" output of the AND gates 71. At this point, the ouput of the AND gate begins to go negative to produce the clock pulse. By time point $T_{y2}$, signal F has returned to logic "0," thereby inducing a change in the state of the clock signal $\phi$2. Thus a two phase clock signal $\phi$1, $\phi$2 is obtained, with the clock signal $\phi$2 having a pulse halfway between successive pulses of clock singnal $\phi$1.

It should be apparent that the technique of this invention is readily adaptable to multiple layer printed circuit board technology. A multiple layer printed circuit board of the type employed in digital data processing systems typically comprises alternate voltage and signal layers, with copper etched strip transmission lines being selectively located on the signal layers. Communication between transmission lines on different layers is established by means of metallic plated holes through the printed circuit board. The various logic circuits are typically plugged into and soldered in these plated holes, thereby establishing electrical connection with selective transmission lines on the underlying signal layers. Multilayer printed circuit boards of the type referred to herein are described in my copending application Ser. No. 86,014 filed Nov. 2, 1970, and assigned to the assignee of this invention.

Figure 4:
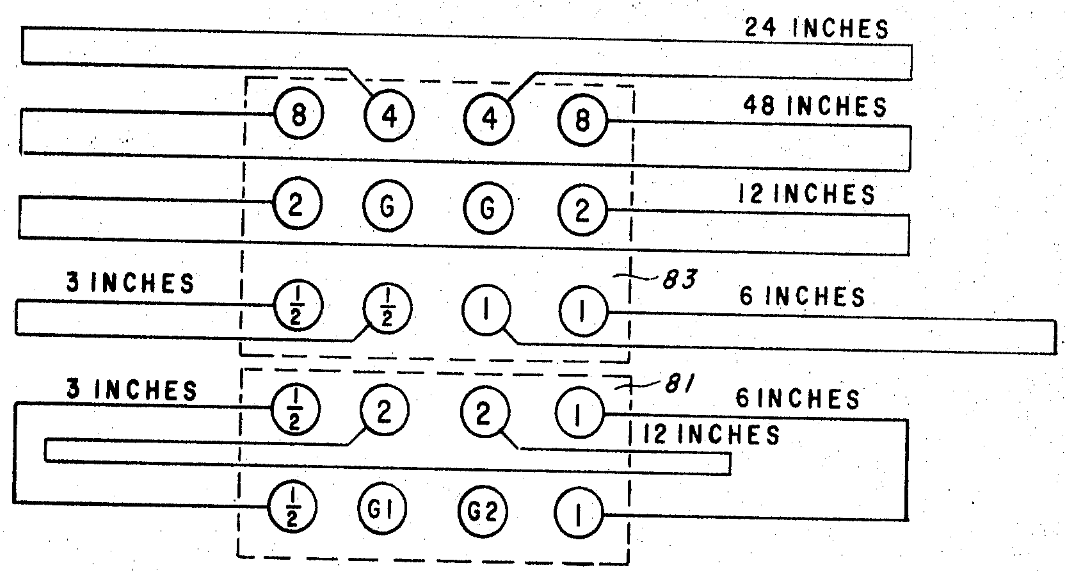
FIG. 4 is a schematic illustration of a preferred embodiment of an adjustable delay line.

An adjustable delay line preferred embodiment is illustrated in FIG. 4. The preferred adjustable delay line comprises a plurality of terminals, which may be plated holes in a multilayer board construction, selective ones of which are interconnected by selective lengths of transmission line. In a preferred embodiment, the lengths of the transmission lines are binary weighted in order to minimize the number of interconnections required to introduce a desired time delay. The signal propagation delay introduced by connecting the signal between any two of the terminals depends upon the length of the transmission line interconnecting the two terminals. For example, the terminals labelled one-half are connected together by a 3-inch segment of transmission line which will introduce a one-half nanosecond time delay by means of the 6-inch per nanosecond propagation delay of copper stripline etch. Similarly, the terminals labelled 2 are interconnected by a 12-inch segment of transmission line, thus to introduce a 2 nanosecond delay. The terminals labelled G are for connection of the input and output to the logic circuits. The terminals may be located sufficiently close together such that by connecting two adjacent terminals by a short wire jumper, only a negligible time delay will be introduced. Also, use of relatively short interconnection jumpers is necessitated in order to minimize signal distortion introduced by these breaks in transmission line continuity. By way of example, in a typical system of multilayer construction printed circuit boards, plated holes may be typically located at 0.1 inch center spacing.

Selective ones of the terminals may be series connected to introduce desired time delays. In adjustable delay line 81 a signal may enter terminal G1 by means of a transmission line embedded in the circuit board and terminal G1 may be connected by means of a wire jumper to the terminal ½ and the other terminal ½ connected to terminal 2 with the other terminal 2 connected to terminal G2 to introduce a 2½ nanosecond time delay. The terminal G2 will be connected to the input of a logic circuit. In this manner, adjustable delay line 81 may be used to introduce from zero to 3½ nanoseconds time delay. To introduce zero time delay (actually a negligible finite time delay), the terminal G1 will be jumped across to the terminal G2. In a simialr manner, the adjustable delay line 83 may be used to introduce from 0 to 15½ nanoseconds time delay, to the nearest one-half nanosecond. In this manner selective time delays may be readily introduced by selective interconnection of prefabricated transmission lines.

It is to be understood that the description herein with reference to specific embodiments of the invention is intended only as illustrative, whereas various modifications within the scope of the invention may now suggest themselves to those skilled in the art.

What is claimed is:

1. A synchronous digital system comprising:

a. means for generating a clock signal;

b. a plurality of locations within said system;

c. means for distributing said clock signal to said plurality of locations;

d. at each of said locations, first time delay means coupled to said clock signal for introducing a first predetermined time delay thereto, thereby synchronizing the occurrence of said clock signal at each of said locations;

e. first logic means coupled to the output of said first time delay means, said first logic means having an inverted output and a non-inverted output;

f. second time delay means connected to at least one of said inverted output and said noninverted output for introducing a second predetermined time delay thereto, said second time delay means is connected only to said inverted output; and g. second logic means coupled for combining said inverted output and said noninverted output to produce a plurality of multi-phased clock signals, each pulse of each phase having a controlled width, said second logic means comprises:

1. a third logic means connected to said noninverted output of said first logic means, said third logic means having an inverted output and a noninverted output;

2. fourth logic means connected to the output of said second time delay means, said fourth logic means having an inverted output and a noninverted output;

3. a plurality of fifth logic means coupled to combine the inverted outputs of said third and fourth logic means to produce a first phase clock signal of controlled pulse width; and

4. a plurality of sixth logic means coupled to combine the noninverted outputs of said third and fourth logic means to produce a second phase clock signal of controlled pulse width.

2. The system of claim 12 wherein said fiftth and sixth logic means are AND gates. 1

* * * * *